(12) United States Patent
Barsun et al.

(10) Patent No.: US 7,658,619 B2
(45) Date of Patent: Feb. 9, 2010

(54) PROCESSOR AND POWER CONVERTER ASSEMBLY WITH RIGIDLY CONNECTED POWER CONNECTOR

(75) Inventors: Stephan K. Barsun, Davis, CA (US); Matt Neumann, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/590,094

(22) Filed: Oct. 31, 2006

(65) Prior Publication Data

US 2008/0102662 A1    May 1, 2008

(51) Int. Cl.
*H01R 12/00* (2006.01)
(52) U.S. Cl. .................. 439/71; 361/728
(58) Field of Classification Search .......... 439/70, 439/71, 372; 361/728–736
See application file for complete search history.

(56) References Cited

U.S. PATENT DOCUMENTS

| | | | |
|---|---|---|---|
| 5,880,945 A * | 3/1999 | Borkar | 363/65 |
| 5,892,275 A * | 4/1999 | McMahon | 257/690 |
| 6,111,753 A * | 8/2000 | Singer | 361/719 |
| 6,328,574 B1 * | 12/2001 | Howell et al. | 439/70 |
| 6,948,047 B2 | 9/2005 | Maruska et al. | |
| 7,046,166 B2 | 5/2006 | Pedyash et al. | |
| 7,093,143 B2 | 8/2006 | Ito et al. | |

\* cited by examiner

*Primary Examiner*—Khiem Nguyen

(57) ABSTRACT

A processor assembly includes a computer processor, a voltage converter, and a converter-power connector. A carrier structure holds these components in rigid relationship with each other.

5 Claims, 5 Drawing Sheets

PROCESSOR AND POWER CONVERTER ASSEMBLY WITH RIGIDLY CONNECTED POWER CONNECTOR

BACKGROUND OF THE INVENTION

Herein, related art may be discussed to put the invention in context. Related art labeled "prior art" is admitted prior art; related art not labeled "prior art" is not admitted prior art.

To facilitate computer repairs and upgrades, computers are often designed with modular components. One such modular component includes a processor and a voltage converter, both mounted on a carrier structure, e.g., daughterboard. This processor-converter assembly is mated with a motherboard so that processor pins engage corresponding sockets. Once the processor assembly is in place, a connector at the distal end of a cable connected to the voltage regulator is mated with a cable connected to a computer power supply. This process is subject to human error in that the power connection can be subject to damage or even forgotten. The present invention addresses the problem of making the installation of a processor-converter assembly more foolproof. Other features of the invention are apparent from the description below with reference to the following drawings.

BRIEF DESCRIPTION OF THE DRAWINGS

The following drawings are of an embodiment of the invention and not of the invention itself.

DETAILED DESCRIPTION

The present invention provides for a "blind-mate" connection between a processor-converter assembly and a host system. The processor data connections and the power connection to the converter are rigidly positioned with respect to each other. Likewise, respective connectors on the host system are rigidly connected. Accordingly, properly aligning and installing the assembly so that the processor is engaged ensures that the power connection is also properly made. Thus, installing a processor-converter module is a unified action. Provisions for aligning processor pins so that they do not get damaged benefit the power connection. Also, as long as the processor is installed, the power connection cannot be omitted or "forgotten". Accordingly, the present invention provides for a simpler and less error-prone method of installing processor-converter assemblies.

Figure 1:
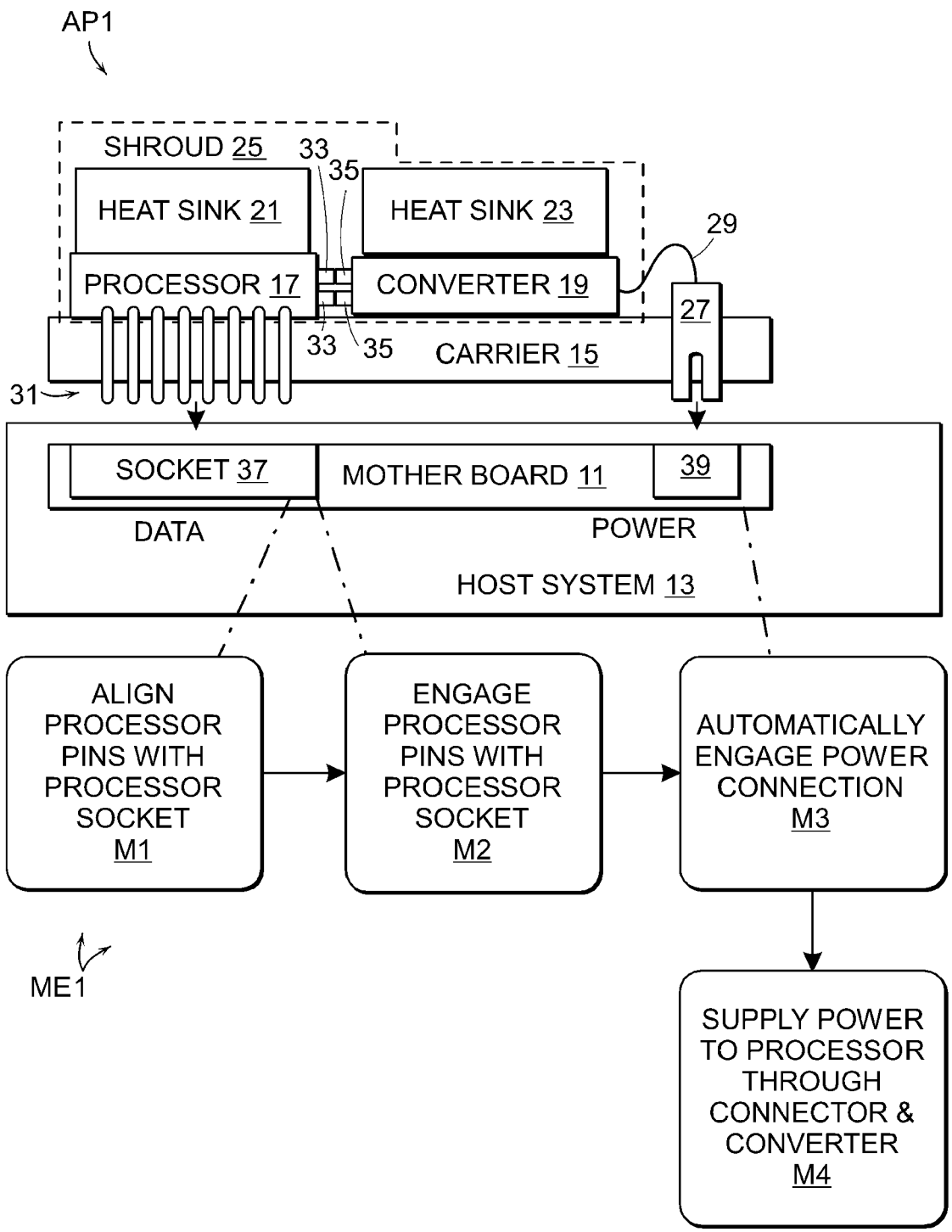
FIG. 1 is a combination schematic diagram and flow chart of an assembly and method in accordance with an embodiment of the invention.
Figure 2:
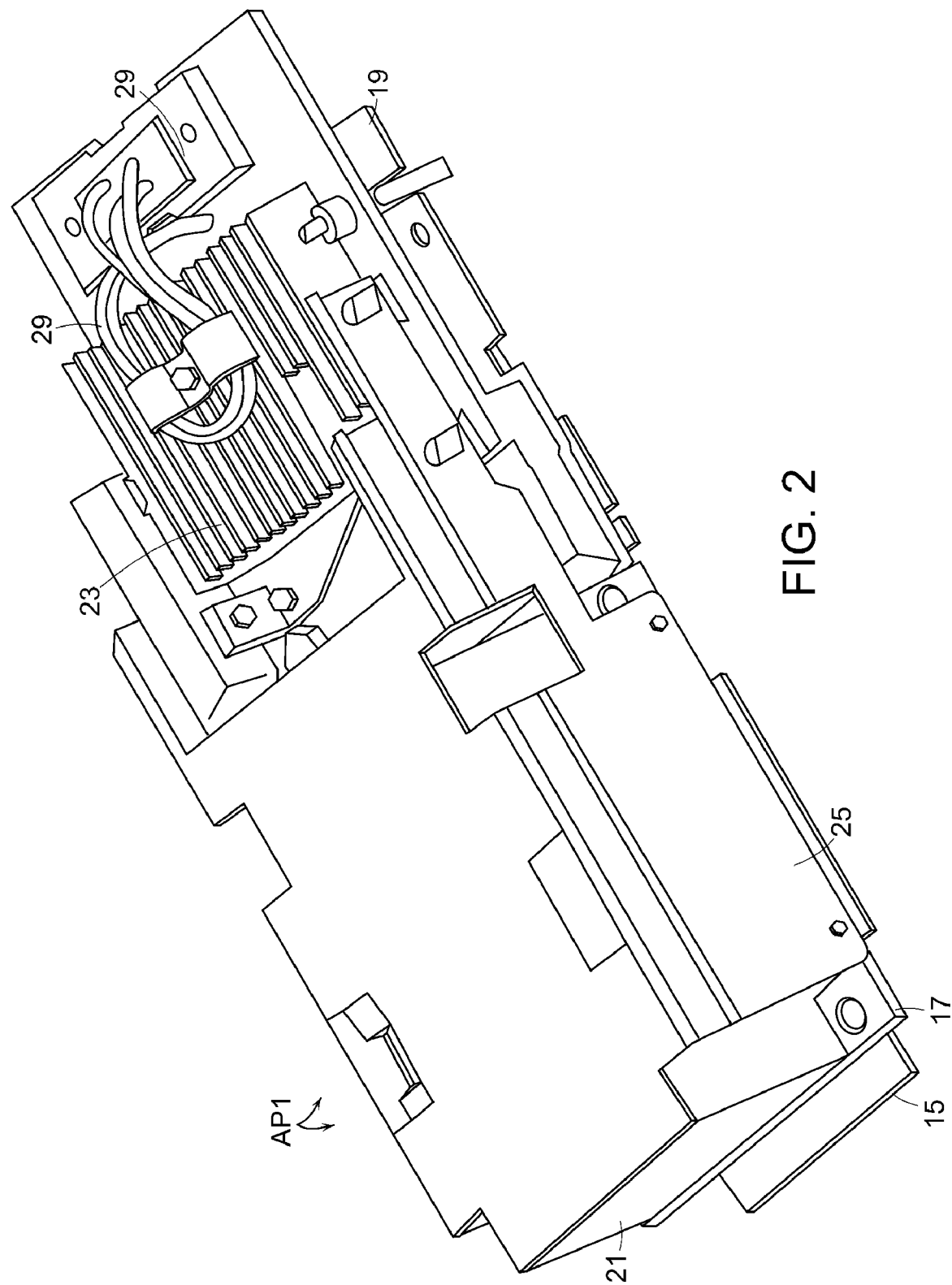
FIG. 2 is a schematic top perspective view of a processor-converter assembly of FIG. 1.
Figure 3:
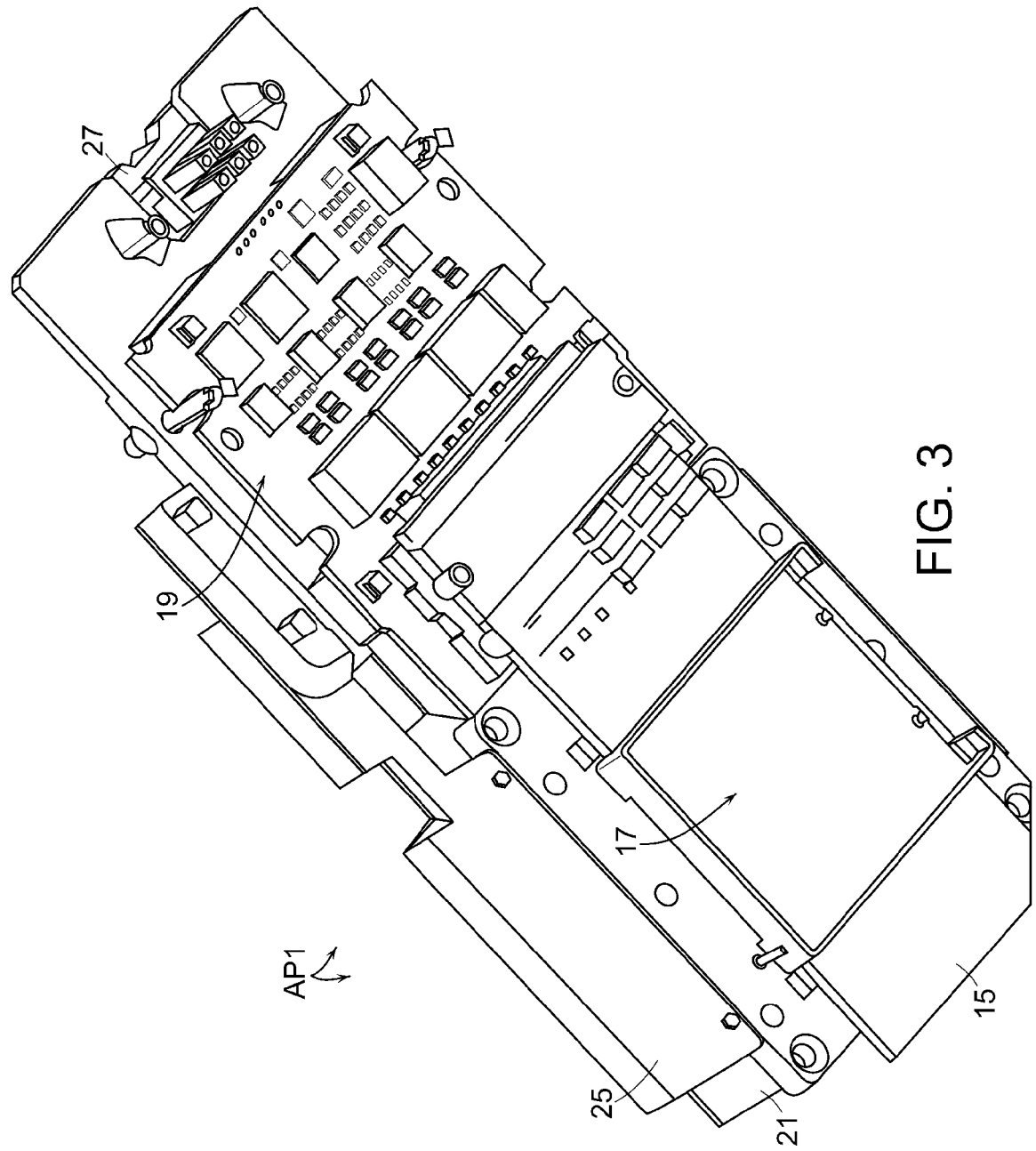
FIG. 3 is a schematic bottom perspective view of the processor-converter assembly of FIG. 2.

A processor-converter assembly AP1 designed to be installed on the motherboard 11 of a host system 13 is shown very schematically in FIG. 1 and more realistically in FIGS. 2-5. Processor-converter assembly AP1 includes a carrier 15, a processor 17, a voltage converter 19, heat sinks 21 and 23, a shroud 25, a power connector 27, and a cable 29. Computer processor 17 is an integrated circuit that manipulates data received via contacts 33. Heat sink 21 dissipates heat generated by processor 17 to prevent the build-up of heat, which could damage processor 17 and surrounding components.

Power converter 19 converts power to voltages required by processor 17. Power converter 19 has contacts 35 that physically contact processor contacts 33 to provide electrical connectivity therebetween. Converter heat sink 23 dissipates heat generated by power converter 19. Shroud 25 is attached to converter heat sink 23 and to carrier 15, and wraps around processor heat sink 21. Shroud 25 serves to fix the positions of processor 17 and converter 19 to ensure good electrical contact therebetween.

Power connector 27 is electrically connected to power converter 19 via power cable 29. Power connector 27 is fixed (rather than free floating) to carrier 15 so that it is rigidly coupled to processor 17 and its pins 31. Thus, when assembly AP1 is mounted on mother board 11 so that pins 31 properly engage processor socket 37 of motherboard 11, power connector 27 automatically engages a separate power connector 39 on motherboard 11. In the illustrated embodiment, power converter 19 is between processor 17 and connector 27. In alternative embodiments, other arrangements are employed.

Figure 4:
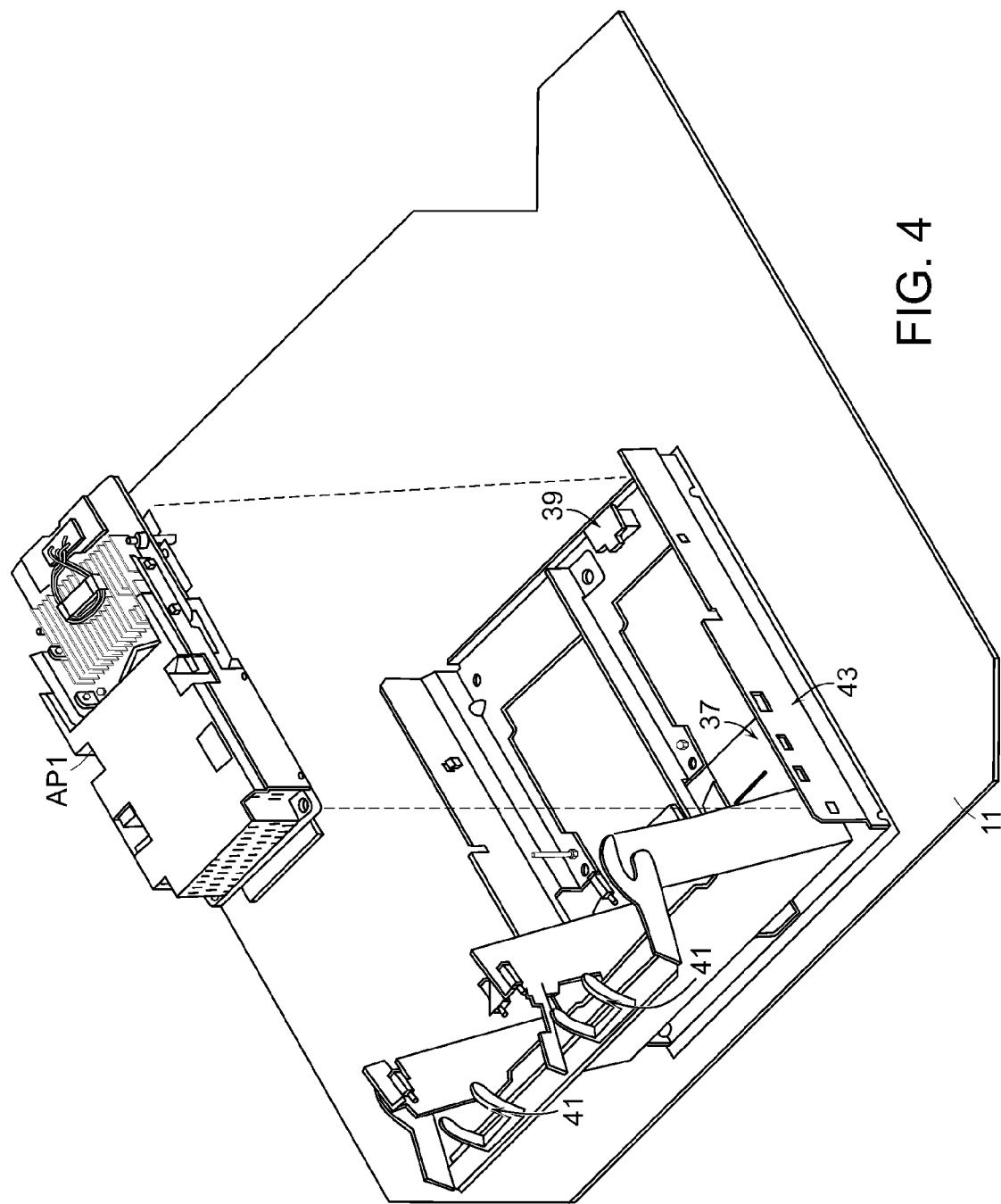
FIG. 4 is a schematic view of the processor-converter assembly of FIG. 1 being installed on a motherboard of FIG. 1.
Figure 5:
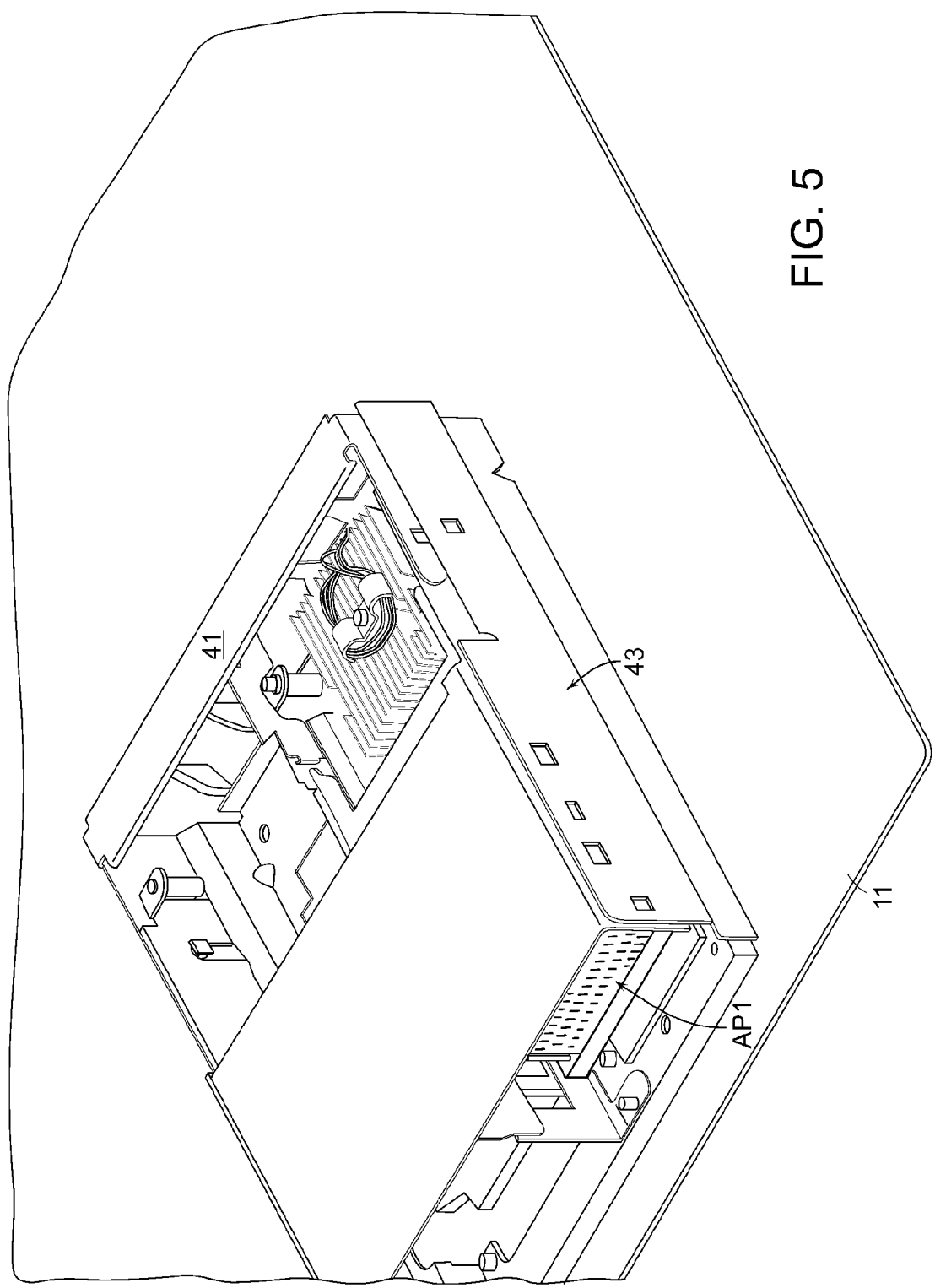
FIG. 5 is a schematic perspective view of the processor converter assembly of FIG. 1 installed on the motherboard of FIG. 1.

A method ME1 of mounting processor-converter assembly AP1 onto motherboard 11 of host system 13 is flow charted in FIG. 1. In method segment M1, processor 17 is aligned with processor socket 37. At method segment M2, assembly AP1 is moved toward motherboard 11 so that processor pins 31 engage processor socket 37. As best seen in FIG. 4, blades 41 attached to motherboard 11 can be used to help guide assembly AP1 into alignment so that pins 31 engage socket 37.

Automatically, at method segment M3, power connector 27 engages power socket 39. Once in place, assembly AP1 is fixed to motherboard 11 using a retention mechanism 43, best seen in FIGS. 4 and 5. There is no separate step of connecting a free-floating power cable of a converter to a power cable connector of a host system. Accordingly, the possibilities of omitting the power connection processor or damaging connectors connecting power cables are greatly reduced. Finally, power can be supplied by the host system, through converter-power connector 27, through cable 29, through voltage converter 19 to processor 17 at method segment M4.

The processor can be any of a variety of processors, e.g., an Itanium single core or multi-core processor, such as those available from Intel Corporation. The power contacts can be on the top (opposite the pins) or a side of the processor. The voltage converter can vary in size and shape, but should otherwise be designed to convert host-system voltages to voltages required by the processor. The power connector can be connected to the converter by a cable or be directly connected or integral with the power converter. It can be a male or female connector. The carrier can be a single PC board (e.g., a daughterboard), or a more complex structure. These and other variations upon and modification to the described embodiments are provided for by the present invention, the scope of which is defined by the following claims.

What is claimed is:

1. A processor-converter assembly comprising:
a computer processor having plural sides, said processor having data contacts on one of said sides and power contacts on another of said sides;
a voltage converter for converting power from a host system to voltages required by said processor, said converter having converter contacts physically and electrically connected to said power contacts;
a converter-power connector for connecting to a host-power connector for receiving host power therefrom; and a carrier structure for holding said processor, said voltage converter, and said converter power connector in rigid relationship with each other.

2. An assembly as recited in claim 1 wherein said converter-power connector is connected to said power converter by a flexible cable.

3. An assembly as recited in claim 1 wherein said power converter is between said processor and said converter-power connector.

4. A processor-converter assembly as recited in claim 1 further comprising first and second heat sinks, said first heat sink contacting said computer processor and said second heat sink contacting said power converter.

5. A processor-converter assembly as recited in claim 1 wherein said computer processor has pins, said carrier structure holding said processor and said power connector so that when said pin properly engages a first socket on a motherboard, said power connector engages a separate second socket on said motherboard.

* * * * *